(12) United States Patent
Chi et al.

(10) Patent No.: US 7,751,421 B2
(45) Date of Patent: Jul. 6, 2010

(54) TRAFFIC GENERATOR AND MONITOR

(75) Inventors: Paul Chi, La Canada, CA (US); Anees Narsinh, Pacific Palisades, CA (US); Marc-Alain Santerre, Calabasas, CA (US); Robert Dexter, Simi Valley, CA (US)

(73) Assignee: Alcatel Lucent, Paris (FR)

( * ) Notice: Subject to any disclaimer, the term of this patent is extended or adjusted under 35 U.S.C. 154(b) by 1514 days.

(21) Appl. No.: 11/027,873

(22) Filed: Dec. 29, 2004

(65) Prior Publication Data
US 2006/0140128 A1 Jun. 29, 2006

(51) Int. Cl.
*H04L 12/54* (2006.01)

(52) U.S. Cl. .................. 370/429; 370/371; 370/374; 370/398; 370/395.4; 370/412

(58) Field of Classification Search .................. 370/389; 711/170
See application file for complete search history.

(56) References Cited

U.S. PATENT DOCUMENTS

| | | | |
|---|---|---|---|
| 5,450,400 A | | 9/1995 | Denissen et al. |
| 5,602,845 A | * | 2/1997 | Wahl .................. 370/395.7 |
| 5,889,779 A | * | 3/1999 | Lincoln .................. 370/398 |
| 6,134,219 A | * | 10/2000 | Sato .................. 370/244 |
| 6,157,955 A | * | 12/2000 | Narad et al. .................. 709/228 |
| 6,414,942 B1 | * | 7/2002 | Ito et al. .................. 370/250 |
| 6,424,659 B2 | * | 7/2002 | Viswanadham et al. ..... 370/469 |
| 6,693,578 B1 | * | 2/2004 | Martinson .................. 342/20 |
| 6,754,795 B2 | * | 6/2004 | Chen et al. .................. 711/170 |
| 6,775,804 B1 | * | 8/2004 | Dawson .................. 714/776 |
| 6,950,405 B2 | * | 9/2005 | Van Gerrevink .......... 370/252 |
| 6,988,177 B2 | * | 1/2006 | Sokol .................. 711/170 |
| 7,035,273 B1 | * | 4/2006 | Pannell et al. .................. 370/412 |
| 7,151,751 B2 | * | 12/2006 | Tagami et al. .................. 370/252 |
| 7,269,179 B2 | * | 9/2007 | Wolrich et al. .................. 370/412 |

(Continued)

FOREIGN PATENT DOCUMENTS

EP 0730359 A 9/1996

OTHER PUBLICATIONS

Knitl W: "Asynchronous Transfer Mode in Broadband Networks", Computers and Communications, 1995., Conference Proceedings of the 1995 IEEE Fourteenth Annual International Phoenix Conference on Scottsdale, AZ, USA, Mar. 28-31, 1995, pp. 558-564, XP010149445.

*Primary Examiner*—Ricky Ngo
*Assistant Examiner*—DeWanda Samuel
(74) *Attorney, Agent, or Firm*—RG&Associates

(57) ABSTRACT

A switch in a data communications network for performing traffic generation in addition to standard switching and routing operations is disclosed. The switch uses a fixed number of test packets retained in a conventional switch buffer to produce one or more infinite packet streams transmitted to a router under test (RUT). The switching device enqueues packets in the priority queues, dequeues the packets from the priority queues, transmits the dequeued packets to the RUT, and re-enqueues a copy of the dequeued packets into the priority queues from which they were dequeued. The enqueued packets and associated pointers to packets are organized into linked lists. By re-writing a copy of each dequeued packet to the tail of a linked list and updating the pointers, the switch produces repeatable streams of test packets. The priority buffers, without the re-write operation, may also be used for conventional egress traffic.

13 Claims, 7 Drawing Sheets

U.S. PATENT DOCUMENTS

| | | | |
|---|---|---|---|
| 7,555,579 B2 * | 6/2009 | Figueira | 710/52 |
| 7,583,664 B2 * | 9/2009 | Ho et al. | 370/386 |
| 2002/0095512 A1 * | 7/2002 | Rana et al. | 709/232 |
| 2002/0176431 A1 * | 11/2002 | Golla et al. | 370/412 |
| 2003/0012141 A1 | 1/2003 | Gerrevink et al. | |
| 2004/0095890 A1 | 5/2004 | Wang et al. | |
| 2004/0252711 A1 * | 12/2004 | Romano et al. | 370/412 |
| 2006/0031643 A1 * | 2/2006 | Figueira | 711/154 |

* cited by examiner

TRAFFIC GENERATOR AND MONITOR

FIELD OF INVENTION

The invention relates to a technique for transmitting packets to interrogate network devices and evaluate their performance based on the returned packets. In particular, the invention relates to a system and method for using a switch or a router to generate and transmit test packets to equipment under test while concurrently transmitting conventional packets to other nodes reachable through the system.

BACKGROUND

A traffic generator is used in data communications networks to transmit pseudo-traffic to a "device under test," typically a router or switch. If a traffic generator and the device under test are connected so as to form one or more transmission loops, the traffic generator may receive the pseudo-traffic back from the device under test for purposes of monitoring the device's ability to properly classify, buffer, and forward data traffic under conditions that model real-word demands. In the prior art, however, the traffic generators are dedicated devices with a high per-port cost due, in part, to the need for increasingly higher speed processors and memory, for example, since the traffic generator must be capable of achieving the same transmission rates as the routers and switches under test. There is therefore a need to reduce the per-port cost of the traffic generator while maintaining the transmission rates of modern routers and switches.

SUMMARY

The invention in some embodiments features a system and method of adapting a network switch or router to perform traffic generation and monitoring in addition to, and preferably concurrently with, standard switching and routing operations. The invention enables the network switching device to deployed in a network to probe and evaluate a router under test (RUT) with reduced expense and greater convenience. The switching device in some embodiments comprises a first set of at least one priority queue and a queue manager. The queue manager is adapted to enqueue packets in each of the priority queues, dequeue the packets from the priority queue, and re-enqueue the dequeued packets into the priority queues from which they were dequeued. The priority queues are preferably first in first out (FIFO) memories adapted to retain a plurality of packets and a pointer associated with each of the packets. The pointers are made to point to a succeeding packet in the queue. Each of the queues is therefore a linked list having a tail in which packets are enqueued and a head from which packets are dequeued. Where the priority queue is adapted to buffer test packets designed to probe the RUT, a copy of each dequeued packets is re-written at the tail of the same priority queue and the linked list updated. The same type of priority buffers may also be used to buffer and dequeue conventional egress traffic, only the dequeued packets are transmitted to the RUT but not re-enqueued. By repeating the process of re-enqueuing test packet, the switching device is able to direct an infinite packet stream to the RUT using a fixed number of test packets retained in conventional switch buffers.

BRIEF DESCRIPTION OF THE DRAWINGS

The present invention is illustrated by way of example and not limitation in the figures of the accompanying drawings, and in which.

DETAILED DESCRIPTION

Figure 1:
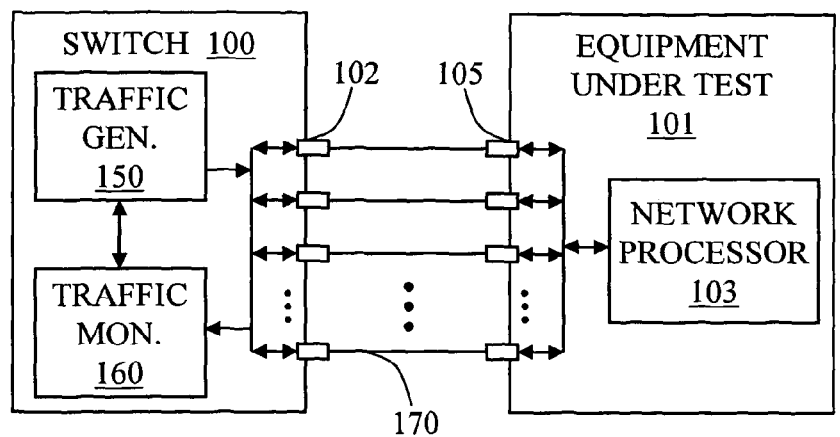
FIG. 1 is a functional block diagram of a network for executing traffic generation and monitoring, in accordance with the first embodiment of the present invention, according to the first embodiment of the present invention.

Illustrated in FIG. 1 is a functional block diagram of a network for executing traffic generation and monitoring. The network includes a first node 100 for transmitting one or more test packets to a second node 101 for purposes of evaluating the capability of the second node 101 to properly process network traffic. In the preferred embodiment, the first node 100 is a multi-layer switch adapted to interrogate the second node 101 with test packets and then evaluate the test packets upon their return to the first node 100. The second node being subjected to the interrogation, referred to herein as the equipment under test (EUT), generally receives, classifies, and buffers the test packets before they are then sent back to the first switch 100. The multi-layer switch 100 and EUT 101 may be two of a plurality nodes and other addressable entities operatively coupled to a data communications network embodied in a local area network (LAN), wide area network (WAN), metropolitan area network (MAN), or Internet, for example.

The multi-layer switch 100 preferably comprises a traffic generator 150 adapted to produce one or more simulated packet flows that are then transmitted from one or more local ports 102 to the ports of the EUT 101 via the network segments 170, e.g., network cables. Upon receipt, the network processor 103 of the EUT 101 generally makes switching and routing decisions necessary to transmit the test packets to the appropriate ports 105 of the EUT 101. If the traffic generator 150 generates Open Systems Interconnect (OSI) reference model Layer 3, i.e., the network layer, packets destined for one of the ports 105 of the EUT 101 while transmitting those packets to a different port 105 of the EUT 101, the EUT then normally classifies, buffers, and then transmits those packets back to the multi-layer switch 100 where they are evaluated by the traffic monitor 160. The switch 100 may then compare the test packets transmitted by the traffic generator 150 to determine if the EUT 101 performed consistently with the applicable protocols and design specifications.

In accordance with the preferred embodiment, a multi-layer switch may be adapted to serve as a traffic generator at significantly reduced per-port cost compared to a dedicated traffic generator/monitor. In particular, a stand-alone switch or enterprise switch may be adapted to integrally incorporate the traffic generator 150 and traffic monitor 160, thereby taking advantage of the high-speed processing resources of the switch with minimal detrimental impact on the switching performance, if any.

Figure 2:
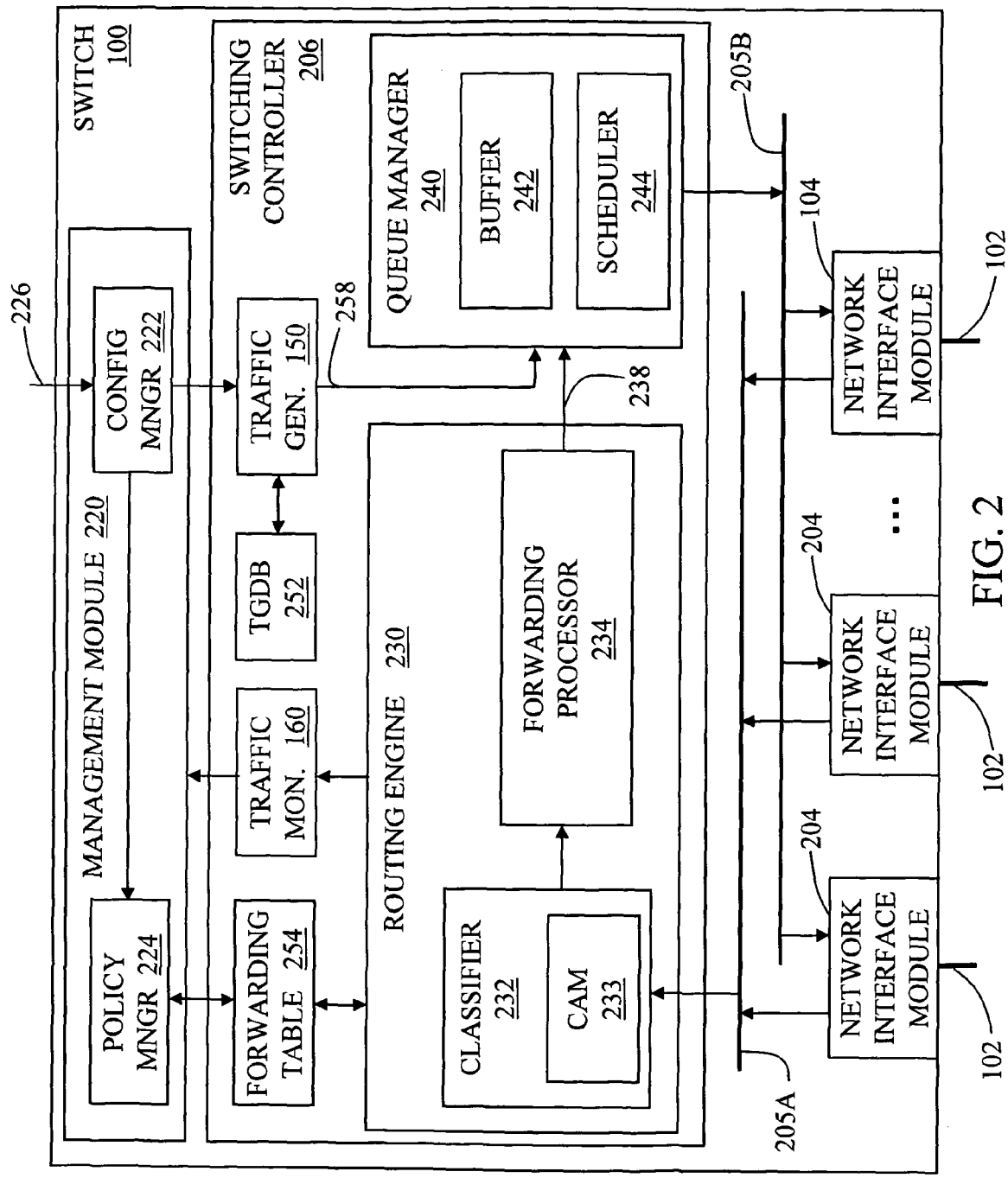
FIG. 2 is a functional block diagram of a multi-layer switch adapted to perform traffic generation (TG) and monitoring operations, according to the first embodiment of the present invention.

Illustrated in FIG. 2 is a functional block diagram of a multi-layer switch adapted to perform traffic generation (TG) and monitoring operations. The switch 100 of the preferred embodiment comprises one or more network interface modules (NIMs) 204, one or more switching controllers 206, a management module 220, the traffic generator 150 and traffic monitor 160, all of which cooperate to receive ingress data traffic and transmit egress data traffic via each of the external ports 102. For purposes of this embodiment, data flowing into the switch 100 from another network node is referred to herein as ingress data, which comprises ingress protocol data units (PDUs). In contrast, data propagating internally to an external port 102 for transmission to another network node is referred to as egress data, which comprises egress PDUs. Each of the plurality of the external ports 102 is a duplex port adapted to receive ingress data and transmit egress data.

The NIMs 204 preferably include one or more physical layer interfaces and media access control (MAC) interfaces adapted to exchange PDUs, e.g., Ethernet frames, via network communications links 107. The ingress PDUs are conveyed from the plurality of NIMs 204 to the switching controller 206 by means of one or more ingress data buses 205A. Similarly, the egress PDUs are transmitted from the switching controller 206 to the plurality of NIMs 204 via one or more egress data buses 205B.

The management module 220 generally comprises a policy manager 224 for retaining and implementing traffic policies. The policies implemented by the policy manager 224 are preferably based in part on Layer 2 and or Layer 3 addressing information derived from source learning operations, route information received from other routing devices, and filtering rules uploaded by the network administrator via a configuration manager 222 using, for example, simple network management protocol (SNMP) messages 226. The traffic policies derived from source learning, other network nodes, and the administrator are made available to the routing engine 230 and collectively represented by the forwarding table 254.

In addition to the traffic policies, the management module may also be used to transmit traffic generation and monitoring (TGM) instructions to the traffic generator 150 and transmit TGM from the traffic monitor 160.

The switch 100 preferably comprises at least one switching controller 206 capable of, but not limited to, Layer 2 (Data Link) and Layer 3 (Network) switching operations as defined in the Open Systems Interconnect (OSI) reference model. The set of possible Layer 2 protocols for operably coupling the external ports 102 to a wired and/or wireless communications link include the Institute of Electrical and Electronics Engineers (IEEE) 802.3 and IEEE 802.11 standards, while the set of possible Layer 3 protocols includes Internet Protocol (IP) version 4 defined in Internet Engineering Task Force (IETF) Request for Comment (RFC) 791 and IP version 6 defined in IETF RFC 1883.

The switching controller 206 preferably comprises a routing engine 230, a forwarding table 254, a queue manager 240, as well as the traffic generator 150 and traffic monitor 160. The routing engine 230, in turn, comprises a classifier 232 that receives ingress PDUs from the data bus 205A, inspects one or more fields of the PDUs, classifies the PDUs into one of a plurality of flows using a content addressable memory 233, and retrieves forwarding information from the forwarding table 254 retained in high-speed memory. The forwarding information retrieved from the forwarding table 254 preferably includes, but is not limited to, a flow identifier used to specify those forwarding operations necessary to prepare the particular PDU for egress, for example.

The forwarding processor 234 receives the ingress PDUs with the associated forwarding information and executes one or more forwarding operations prior to transmission to the appropriate egress port or ports. The forwarding operations preferably include but are not limited to header transformation for re-encapsulating data, VLAN tag pushing for appending one or more VLAN tags to a PDU, VLAN tag popping for removing one or more VLAN tags from a PDU, quality of service (QoS) for reserving network resources, billing and accounting for monitoring customer traffic, Multi-Protocol Label Switching (MPLS) management, authentication for selectively filtering PDUs, access control, higher-layer learning including Address Resolution Protocol (ARP) control, port mirroring for reproducing and redirecting PDUs for traffic analysis, source learning, class of service (CoS) for determining the relative priority with which PDUs are allocated switch resources, and color marking used for policing and traffic shaping, for example.

After the forwarding processor 234, the PDUs are passed to and stored in the queue manager 240 until bandwidth is available to transmit the PDUs to the appropriate egress port. In particular, the egress PDUs are buffered in one or more of a plurality of priority queues in the buffer 242 until they are transmitted by the scheduler 244 to the external port 102 via the output data bus 205B.

In accordance with the preferred embodiment, the TGM-enabled switch 100 further includes a traffic generator 150 and traffic monitor 160. The traffic generator 150 is adapted to simulate traffic flows to evaluate the packet processing operations of another network node. In particular, the traffic generator 150 in the preferred embodiment is adapted to generate one or more test PDUs, herein referred to as TG-PDUs, associated with one or more different flows. In the preferred embodiment, the TG-PDUs are generated by the traffic generator 150 in accordance with the criteria provided by the network administrator. The flows of the TG-PDUs are generally characterized by a particular source address and destination address, although the TG-PDUs may be imbued with one or more other packet properties under test at the EUT 101. The TG-PDUs may have, for example, any combination of source and destination address, protocol type, one or more VLAN tags including 802.1Q tags, priority including 802.1p priority, and quality of service (QoS) designators.

The TG-PDUs preferably have the same intra-switch format as conventional switched PDUs from the routing engine 230. In the preferred embodiment, the conventional PDUs and therefore the TG-PDUs transmitted to the queue manager 240 include a packet descriptor used internally within the switch 100 to communicate processing instructions between processing entities. The packet descriptor preferably includes, for example, a queue identifier (QID) used to specify the one or more priority queues of the buffer 242 into which the associated PDU or TG-PDU is to be buffered. The packet descriptor may further include a TG-flag used by the queue manager 240 to differentiate genuine traffic flows from simulated traffic flows.

The traffic generator 150 in some embodiments is adapted to store one or more pre-generated sequences of TG-PDUs to the traffic generator database (TGDB) 252, although the generator 150 may also dynamically produce the TG-PDUs in real-time. The pre-generated sequences of TG-PDUs retained in the TGDB 252, also referred to as a TG-flow, are then retrieved as needed and transmitted to the queue manager 240. In particular, the TG-PDUs 258 are injected into the data stream 238 from the routing engine 230 and the confluence of egress packets and test packets provided as input to the queue manager 240. Upon receipt, the queue manager 240 buffers the TG-PDUs in dedicated priority queues, also referred to as virtual output queues (VOQ), among the other priority queues servicing conventional ingress packet flows. The egress port and maximum transmission rate of each of the VOQs into which the TG-PDUs are enqueued are preferably set forth in a QoS profile associated with each virtual output queue. The switch 100 is, therefore, adapted to perform standard traffic forwarding operations simultaneously with the TGM operations without disturbing the conventional PDUs propagating through the switch 100.

In some embodiments, the switch 100 further includes a traffic monitor 160 adapted to inspect the TG-PDUs transmitted to and returned from the EUT 101. By comparing the TG-PDUs transmitted to the EUT 101 against the returned TG-PDUs, the traffic monitor 160 derives and compiles the statistics sufficient to evaluate the performance metrics of the EUT 101. The performance metrics preferably include the number of TG-PDUs received from the EUT 101, the number TG-PDUs that were properly modified by the EUT 101, and the nature of the problem with those TG-PDUs that were not properly modified by the EUT 101.

Figure 3:
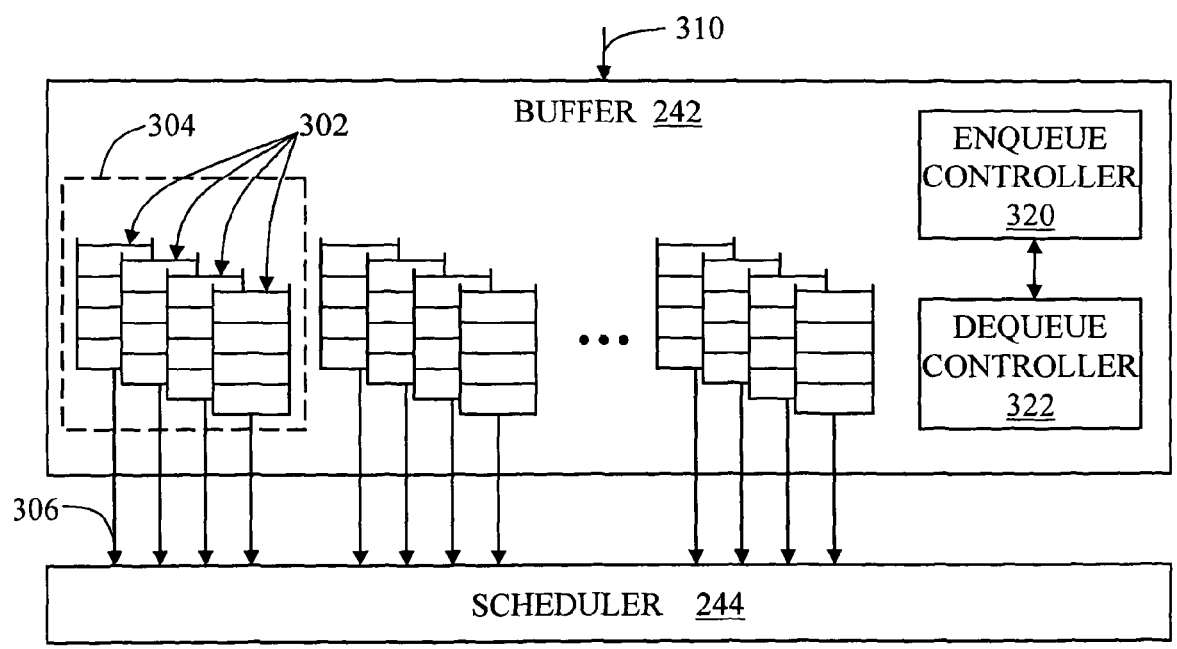
FIG. 3 is a functional block diagram of the queue manager for buffering both conventional and test packets, according to the first embodiment of the present invention.

Illustrated in FIG. 3 is a functional block diagram of the queue manager for buffering both conventional and test PDUs. The confluence of PDUs 310 including the conventional PDUs from the routing engine 230 and TG-PDUs from the traffic generator 150 are transmitted to the buffer 242 and the packets enqueued in one of the plurality of priority queues 302. In the preferred embodiment, each of the PDUs 310 is transmitted with a packet descriptor including the QID specifying the particular priority queue 302 into which the PDU is to be buffered. Instead of a packet descriptor, the QID associated with a PDU may be communicated to the buffer 242 via a separate signaling channel, for example.

Each of the individual priority queues 302 is adapted to retain a plurality of PDUs that are subsequently transmitted toward the designated egress port 102 by the scheduler 244. The scheduler 244 preferably dequeues the PDUs from the plurality of priority queues 302 in accordance with one of a multiplicity of time division multiplexing algorithms employed to efficiently utilize the switch fabric bandwidth while simultaneously optimizing the fairness with which the queues 302 are allocated fractional portions of the bandwidth. Strict priority, weighted fair queuing (WFQ), and round robin are several of the queuing schemes known to those of ordinary skill in the art with which the invention may be implemented. With respect to the scheduler 244, TG-PDUs are indistinguishable from conventional PDUs from the routing engine 230 and are therefore transmitted in accordance with the priority and transmission rate of the queue in which they are buffered.

In the preferred embodiment, the plurality of priority queues 302 are organized as a function of egress port and class of service. A first group 304 of priority queues 302, for example, is associated with an individual external port 102 of the switch 100 and comprises four priority queues 302 that are associated with four different classes of service. The individual priority queues 302 may be first-in-first-out (FIFO) buffers or the queues retained in random access memory (RAM) where they are serviced by queue management software, for example.

In the preferred embodiment, each queue 302 of the plurality of priority queues in the buffer 242 that is selected to buffer test PDUs stores only TG-PDUs. The remaining priority queues 302, however, continue to buffer conventional PDUs from the routing engine 230 including Layer 2 frames and Layer 3 packets addressed to other nodes reachable through the switch 100. A priority queue selected to buffer non-test PDUs is referred to herein as a conventional priority queue, while a priority queue for TG-PDUs is referred to herein as a TG priority queue. The number of priority queues 302 associated with conventional PDUs or for TG-PDUs is programmably changeable as is the egress port, the priority associated with each of the priority queues 302, the number of TG-PDU flows, the frame formats and lengths of the TG-PDUs, and the transmission rates of the TG priority queues.

Both conventional priority queues and TG priority queues are enqueued to and dequeued from the buffer 242 with the assistance of queue pointers to memory cells in the buffer. The pointers are allocated to temporarily store PDUs and are later reassigned as new data is received. The assignment of pointers to PDUs prior to buffering is managed by the enqueue controller 320 and the capture or return of those pointers after the PDUs are dequeued is managed by the dequeue controller 322. The enqueue controller 320 assigns a pointer to each PDU transmitted to the queue manager 240, and the associated PDU stored in the buffer 242 at the memory address indicated by the queue pointer. As described in more detail below, the enqueue controller 320 in the preferred embodiment is also adapted to generate a linked list for outputting each of the TG priority queues in a continuous loop.

Figure 4:
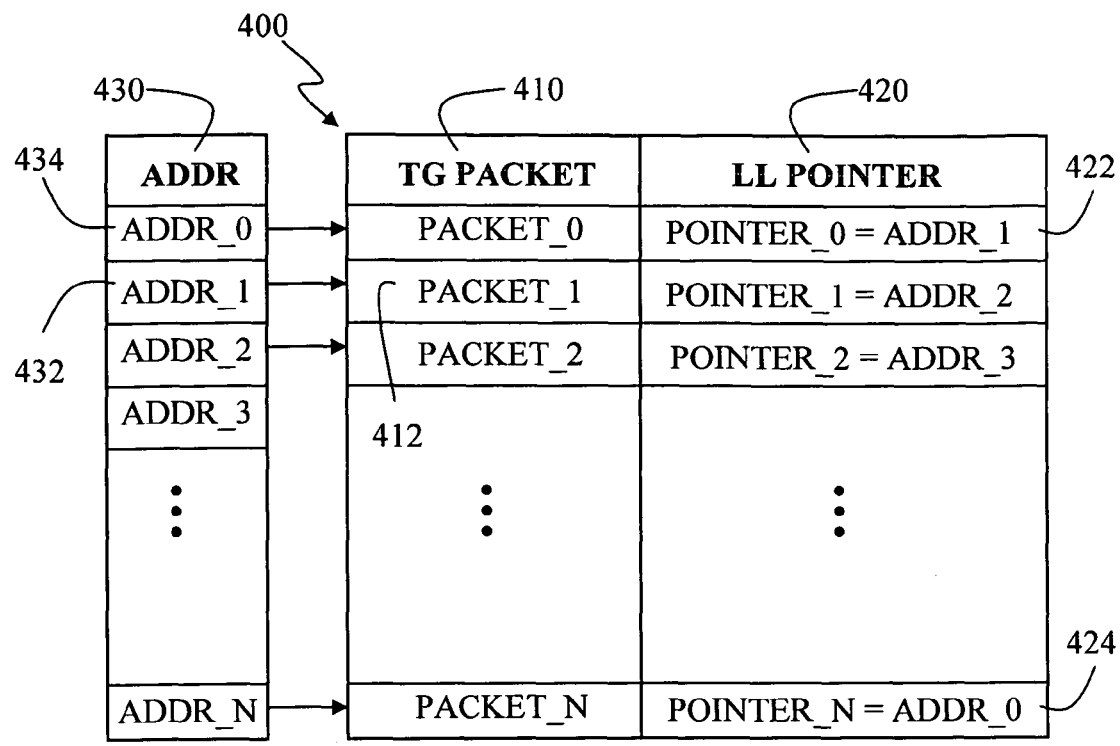
FIG. 4 is a schematic diagram of linked list comprising a plurality of linked list (LL) pointers for outputting test packets in a continuous loop, according to the first embodiment of the present invention.

As illustrated in FIG. 4, a linked list 400 comprises a plurality of elements, each element comprising a TG-PDU depicted in the TG packet column 410 and an associated linked list (LL) pointer depicted in the LL point column 420. Each element of the linked list 400 is retained in buffer memory beginning at a memory address depicted in the address column 430. In general, the LL pointer 420 of a given element has the value of the memory address 430 of the next element in the linked list. The head LL pointer, pointer_0 422, for example, points to a second TG-PDU, packet_1 412, beginning at a second memory address, ADDR_1 432. The linked list 400 is, therefore, a chain of nodes with each subsequent node being a child of the previous one. In accordance with the preferred embodiment, the final LL pointer, pointer_N 424, of the last element, however, has the value of the first memory address, ADDR_0 434, associated with the first element in the linked list 400 and therefore points to the head TG-PDU, packet_0.

Figure 5:
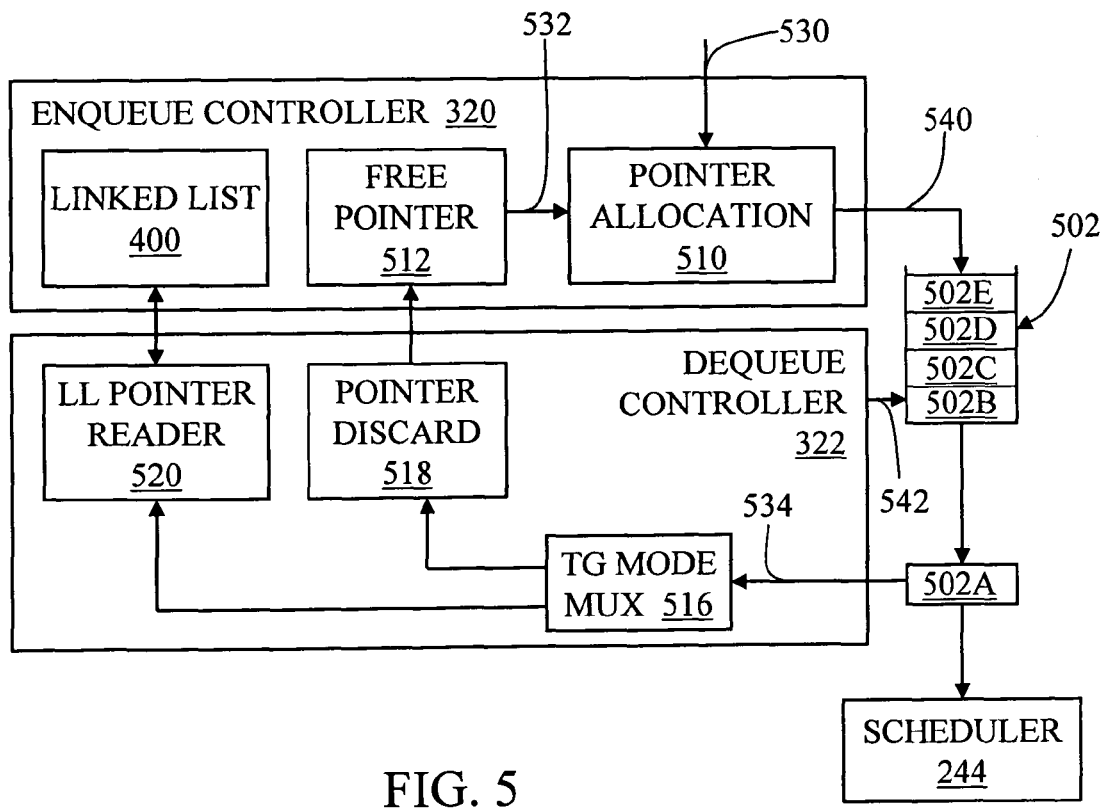
FIG. 5 is a functional block diagram of an enqueue controller and dequeue controller for enabling traffic generation in a multi-layer switch, according to the first embodiment of the present invention.

Illustrated in FIG. 5 is a functional block diagram of the enqueue controller and dequeue controller for enabling traffic generation in a multi-layer switch. The enqueue controller 320 and dequeue controller 322 are illustrated in cooperation with a single priority queue 502 which is one of the plurality of priority queues 302 of buffer 242. The priority queue 502 includes a plurality of memory cells to which PDUs are stored and retrieved. A pointer points to each of the PDUs and each pointer is tracked by the queue manager 240.

In the preferred embodiment, the enqueue controller 320 comprises a pointer allocation module 510 and a free pointer module 512. If the priority queue 502 configured to be a TG priority queue, the enqueue controller 320 further includes a linked list 400 associated with the priority queue 502. The pointer allocation module 510 is adapted to receive and enqueue PDUs 530, including conventional PDUs and TG-PDUs, in the corresponding priority queue 502. The pointer allocation module 510 includes a write pointer 540 pointing to the buffer memory address to which the received PDU 530 is written. The write pointer 540 is set equal to the address of a buffer memory cell available in the priority queue 502. The address to the next buffer memory cell is retrieved from the free pointer module 512 which maintains a record of pointers to memory cells made available as PDUs are released by the scheduler 244.

If the priority queue 502 is a TG priority queue and PDU 512 is a TG-PDU, the enqueue controller 320 constructs a linked list 400 with the TG-PDUs from the traffic generator 150. In doing so, the pointer pointing to TG-PDU 502E is assigned to the LL pointer for the previous element in the linked list 400, i.e., the LL pointer associated with TG-PDU 502D. If the TG-PDU 502E is the last of the series of PDUs 502A-502D being downloaded to the priority queue 502 by the traffic generator 150, the pointer field 420 for last TG-PDU 502E is made to point to the memory address associated with the first PDU 502A, thereby completing the assembly of the linked list 400 in the form of a closed loop.

The dequeue controller 322 in the preferred embodiment comprises a TG mode multiplexor 516, a pointer discard 518, and an LL pointer (LLP) reader 520. The dequeue controller generates a read pointer 542 to the priority queue 502 from which it reads outs a PDU and releases the PDU to the scheduler 244 as bandwidth becomes available. In the preferred embodiment, the priority queue 502 from which the PDU is read is identified by a VOQ identifier provided by the scheduler 244. As the PDUs are released, the dequeue controller 322 determines whether to discard the pointer based on the type of priority queue. In particular, the TG mode multiplexor 516 responds differently depending on whether the queue 502 is a conventional priority queue or a TG priority queue. In the case of a conventional priority queue, the pointer 534 of a newly released PDU 502A is returned to the pointer discard 518. In the case of a TG priority queue, the pointer 534 of a newly released PDU 502A is re-queued to the tail of the same pointer queue via the LLP reader 520.

If the PDU 502A, for example, is released to the scheduler 244, the pointer 534 associated with the PDU 502A is captured by the dequeue controller 322. If the PDU 502A is a conventional PDU, the TG mode multiplexor 516 passes the pointer to the pointer discard module 518. The pointer discard 518 is adapted to receive and temporarily store newly-released pointers so that they may be returned to the list of available pointers maintained by the enqueue controller 320. In particular, the newly-released pointers are returned to the list of available pointers maintained by the free pointer module 510 and incoming PDUs stored in the buffer 242 at the memory address to which they point.

If the queue 502 is a TG priority queue, the LLP reader 520 sequentially retrieves the LL pointers from the linked list 400 to service the priority queue 502. In one embodiment, the multiplexor 516 passes the value of the read pointer 534 to the LLP reader 520 which queries the linked list 400 with the current LL pointer to retrieve the next LL pointer. That is, the LL pointer for the TG-PDU 502A is used to retrieve the LL pointer to TG-PDU 502B from the linked list 400. The LLP reader 520 does not return the pointer to the enqueue controller 320 or the pointer discard 518, thereby preventing the TG-PDU 502A from being overwritten in the buffer 242.

When bandwidth is available and the VOQ identifier associated with linked list is received from the scheduler, the dequeue controller 322 retrieves and dispatches the next packet, TG-PDU 502B, to the scheduler 244. With respect to a particular linked list, each of the TG-PDUs is released in like fashion until the last TG-PDU 502E is retrieved, at which time the LLP reader 520 retrieves the LL pointer that points to the first TG-PDU 502A of the linked list 400. In this manner, the TG-PDUs 502A-502E retained in the TG priority queue 502 are continually provided as a test stream to the EUT 101 for as long as the queue manager 240 is enabled.

Although the linked list 400 is schematically illustrated in FIG. 5 separate and apart from the priority queue 502, one of ordinary skill in the art will appreciate that the linked list 400 may be integral to the priority queue 502. That is, the LL pointers 420 of the linked list 400 may be stored contiguously with the PDU data in the buffer 242. In this manner, the LL pointer to the next TG-PDU may be retrieved from the buffer 242 simultaneously or concurrently with the current TG-PDU being transmitted to the scheduler 244.

The scheduler 244 dequeues the PDUs of each of conventional priority queues of buffer 242 and the test packets of the one or more TG priority queues in accordance with the priority scheme and available bandwidth. The switch 100 in the preferred embodiment is adapted to support as many as 2048 priority queues including both conventional priority queues and TG priority queues, each of which may be selectively directed to any of the plurality of external ports of the switch 100.

Figure 6:
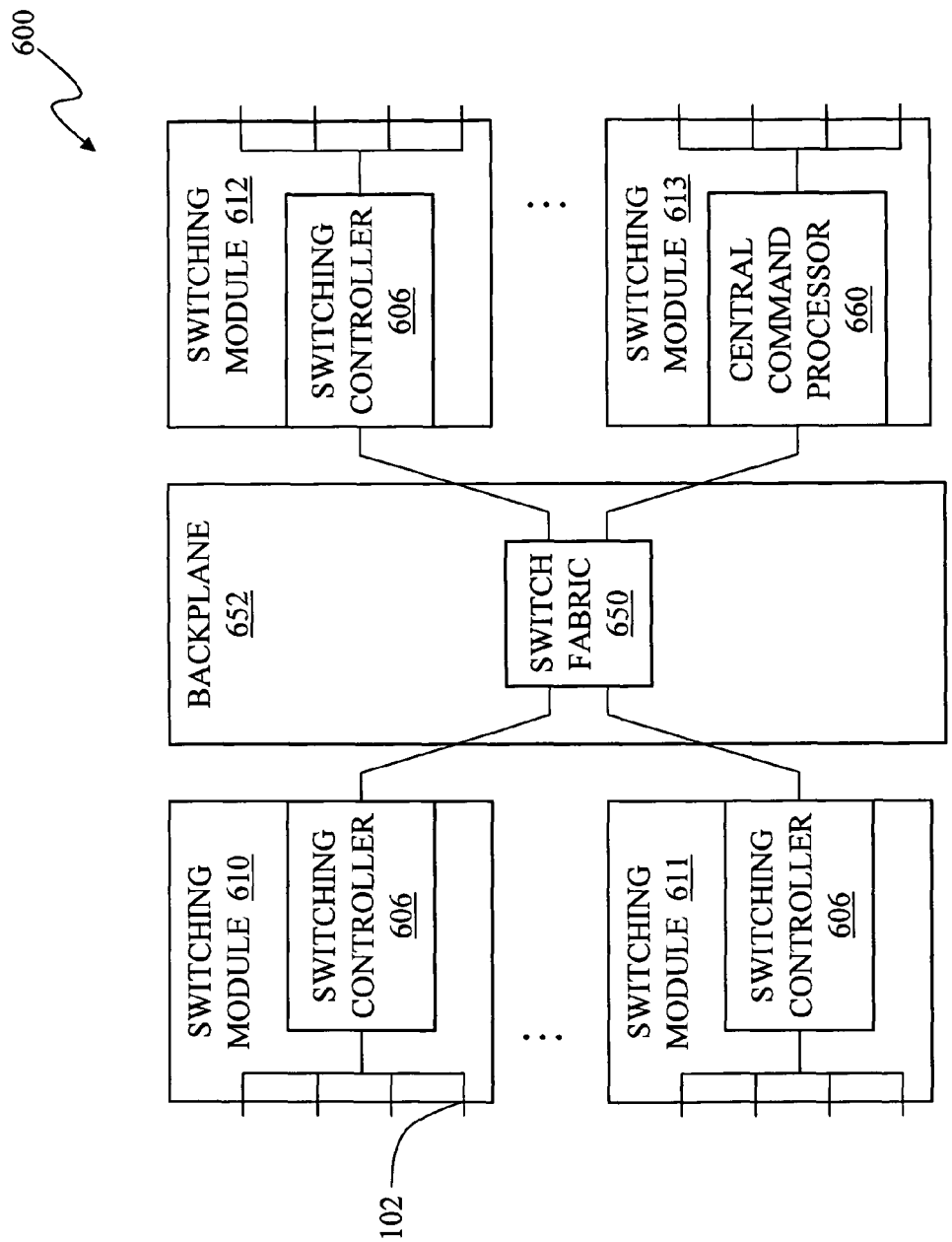
FIG. 6 is a functional block diagram of an enterprise switch adapted to perform traffic generation and monitoring (TGM) operations, according to the second embodiment of the present invention.

Illustrated in FIG. 6 is a functional block diagram of an enterprise switch adapted to perform traffic generation and monitoring (TGM) operations. The enterprise switch 600 preferably comprises a plurality of switching modules 610-613, sometimes referred to as blades, which are seated into slots in the backplane 652. Each of the switching modules 610-613 includes one or more external ports 102, each of which may be operably coupled to another node in the data communications network via a communications link (not shown). Within the enterprise switch 600, each of the one or more ports 102 is operably coupled to the ports 102 of every other switching module 610-613 via a switching fabric 650.

A switching module 610-613 preferably comprises at least one switching controller 606 capable of, but not limited to, at least Layer 2 (Data Link) and Layer 3 (Network) switching operations as defined in the Open Systems Interconnect (OSI) network model.

For purposes of this embodiment, PDUs flowing into a switching module 610-613 from an external port 102 towards the fabric 650 are referred to herein as ingress PDUs. The switching module through which an ingress PDU propagates is referred to as the ingress switching module. In contrast, PDUs flowing away from the fabric 650 to an external port 102 are referred to as egress PDUs. The switching module through which an egress PDU propagates is referred to as an egress switching module. Each of the plurality of switching modules of the preferred embodiment may serve as both an ingress switching module and an egress switching module for purposes of different flows.

The enterprise switch 600 further includes a central command processor (CMM) 620 for managing and coordinating various system resources including TGM statistics discussed in more detail above. In the preferred embodiment, the CMM 620 is embodied in one of the plurality of switching modules 610-613, although one skilled in the art will appreciate that the functions performed by the CMM may be executed by one or more entities incorporated in the backplane 652 and or a separate management module.

Figure 7:
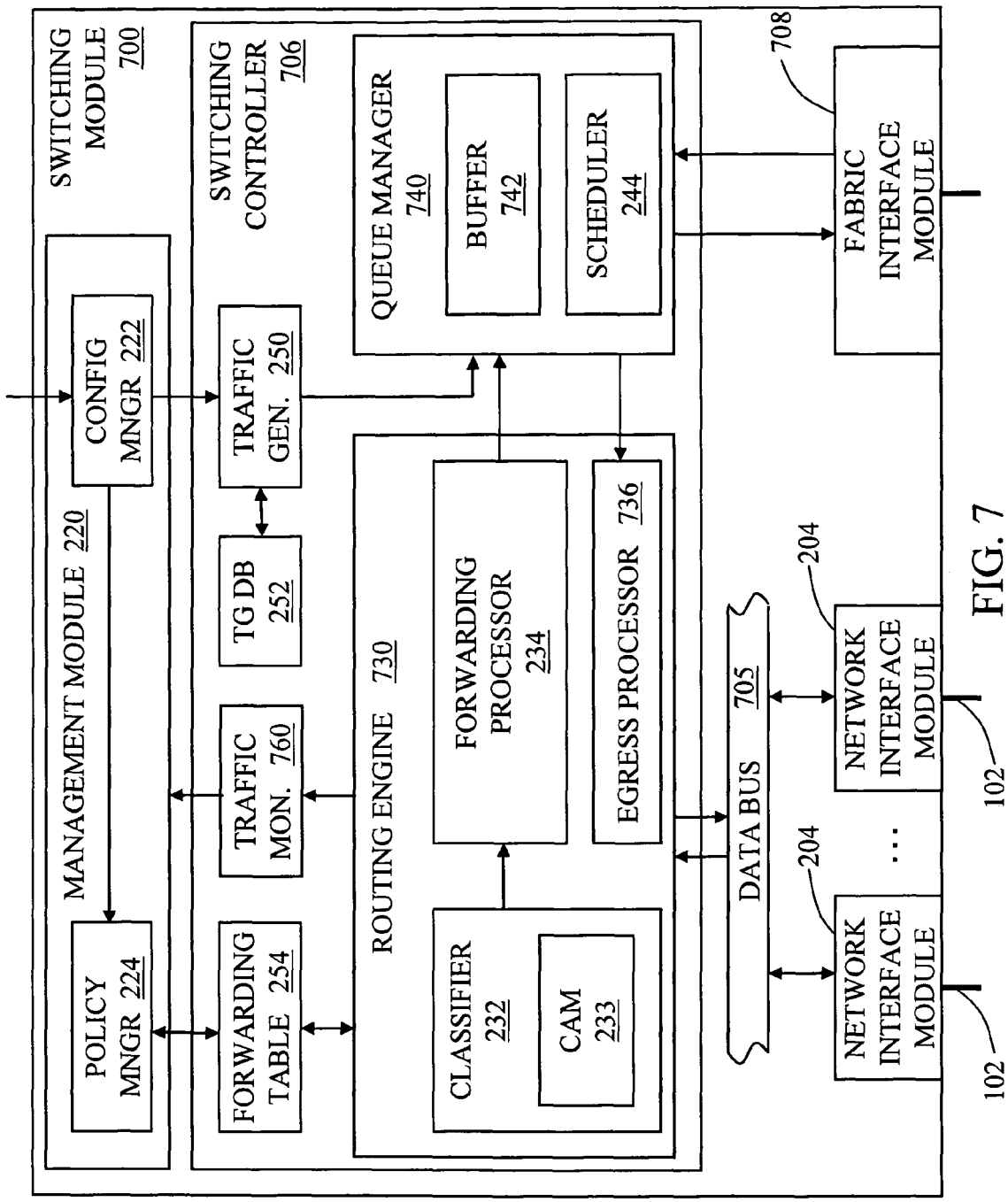
FIG. 7 is a functional block diagram of a TGM-enabled switching module for performing traffic generation and monitoring (TGM) operations, according to the second embodiment of the present invention.

Illustrated in FIG. 7 is a functional block diagram of a TGM-enabled switching module for performing traffic generation and monitoring (TGM) operations. The switching module 700 of the preferred embodiment, consistent with switching modules 610-613, comprises one or more network interface modules (NIMs) 204, one or more switching controllers 706, a management module 220, and a fabric interface module 708. Like the first embodiment, each of the NIMs 204 is operatively coupled to one or more external ports 102 for purposes of receiving ingress data traffic and transmitting egress data traffic. The ingress PDUs are conveyed to the switching controller 706 by means of one or more internal high-speed serial data buses 705. Like the first embodiment, the switching controller 706 preferably classifies the ingress PDUs, performs any necessary forwarding operations assigned for execution at ingress, and enqueues the PDUs until bandwidth is available to transmit the PDUs to the appropriate one or more egress blades via the switching fabric 650.

With respect to egress operations, the switching module 700 is also adapted to receive egress PDUs from the switching fabric 650 via the fabric interface module 708 and enqueue those PDUs in the buffer 742. The switching controller 706 of the switching module 700 at egress may perform one or more additional forwarding operations before the PDU and buffer the egress PDUs prior to transmission to the appropriate NIM 204 and corresponding egress port 102.

As in the first embodiment described above, the management module 220 preferably comprises a policy manager 222 for retaining and implementing traffic policies uploaded to the switching module 700 via a configuration manager 224 by a network administrator. The configuration manager 124 in the second embodiment is adapted to transmit test PDU criteria from the CMM 660 to the traffic generator 750 and to return the TG statistics compiled by the traffic monitor 760 to the CMM 660 where the performance of the EUT 101 may be evaluated.

The switching controller 706 of the second preferred embodiment is adapted to perform Layer 2 switching operations and Layer 3 routing operations using PDU properties associated with Layer 2 through Layer 7 as defined in the OSI network reference model. The switching controller 706 preferably comprises the routing engine 730, a forwarding table 254, a queue manager 740, as well as a traffic generator 250 and traffic monitor 760. As with the first embodiment, the routing engine 730 comprises a classifier 232 that classifies the PDUs into one of a plurality of flows and a forwarding processor 234 to execute one or more forwarding operations necessary to transmit the PDUs to the appropriate external ports of the switching modules 610-613.

In addition to the ingress processing described above, the routing engine 730 also processes egress traffic received from the switch fabric 650. In particular, the routing engine 730 further includes an egress processor 736 for transmitting egress PDUs received from the switching fabric 650 to the designated egress port 102 among the NIMs 204.

After being received by the forwarding processor 234, the ingress PDUs are then passed from the forwarding processor 234 to the queue manager 740 where they are temporarily buffered 742 prior to transmission by the scheduler 244 to the switching fabric 650 via the fabric interface module 708. The queue manager 740, analogous to the first embodiment, comprises a buffer 742 adapted to generate one or more linked lists 400 used to repeatedly transmit test packets in the direction of the egress ports via the scheduler 244. The queue manager 740 differs from the queue manager 240 of the first embodiment to the extent that it may also buffer egress traffic received from switching fabric 650 en route to a local egress port.

As in the first embodiment, the TGM-enabled switching module 700 further includes a traffic generator 250 and TGDB 242 for simulating traffic flows and test switching and routing operations within the enterprise switch 600 as well as other network nodes. The switching module 700 also includes a traffic monitor 760 for compiling the TG statistics with which the CMM 660 determines whether the EUT 101 is able to perform switching and routing operations properly.

One skilled in the art will appreciate that the traffic generator 250 and traffic monitor 260 of the switching module 700 and other switching modules 610-613 of the enterprise switch 600 may be coordinated through the CMM 660 due to the distributed nature of the processing in the enterprise switch. In particular, depending on the topology of network, test packets generated by the traffic generator 250 of the module 700 may be transmitted to an EUT 101 and received back on a port of a different switching module. As such, the traffic generator and monitor analyzing a common flow may be divided across different blades. The CMM 660 is therefore responsible for instructing the traffic generator 250 of one switching module to produce at least one TG-PDU flow, and for analyzing TG statistics collected from the traffic monitor of each of the one or more switching modules 610-613 from which modified test PDUs may be received.

Figure 8:
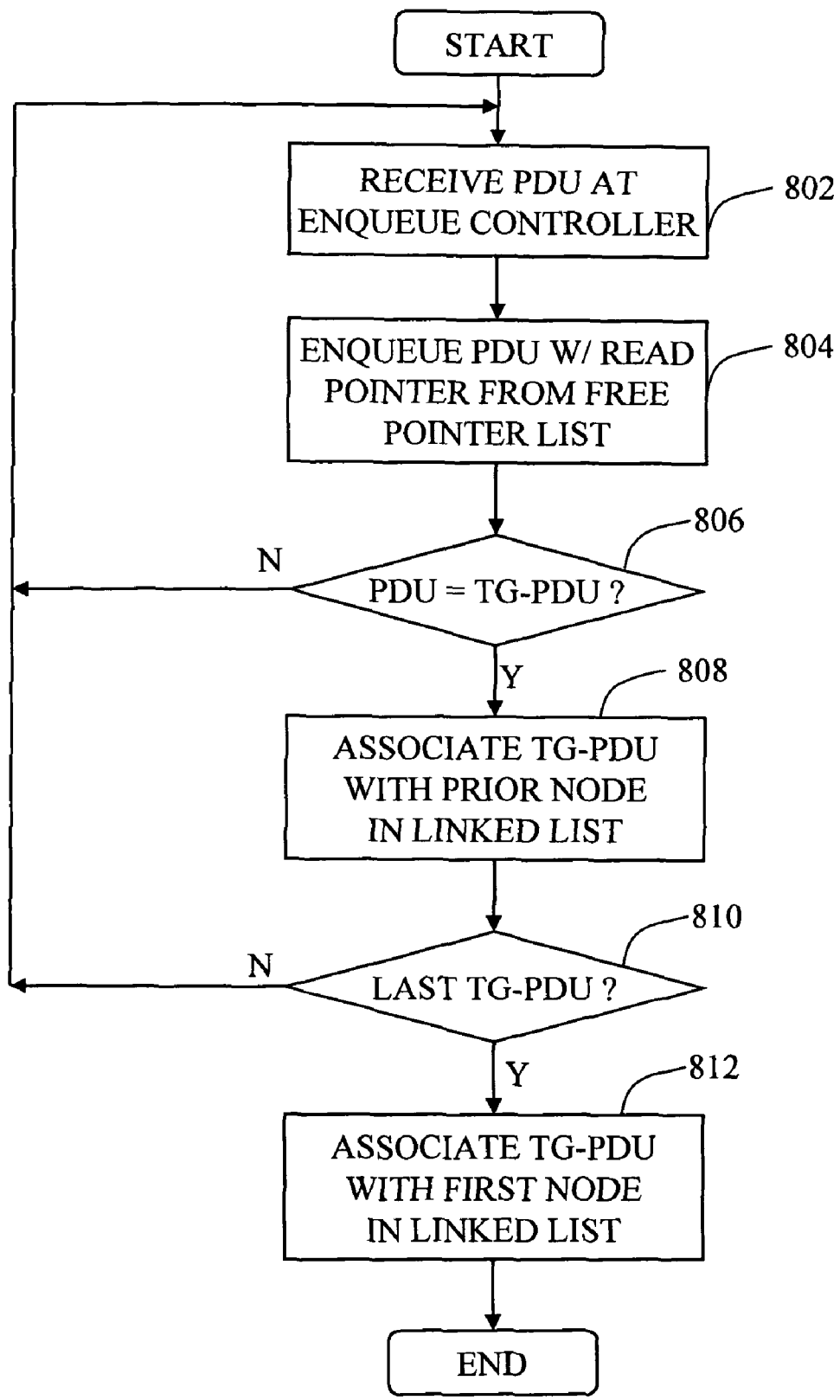
FIG. 8 is flowchart of the method by which an enqueue controller buffers test packets for a given priority queue, according to the second embodiment of the present invention.

Illustrated in FIG. 8 is the method by which the enqueue controller buffers test packets for a given priority queue. Upon receipt (step 802) of a PDU at the enqueue controller 320 from the traffic generator 150, the pointer allocation module 510 enqueues (step 804) the PDU in the buffer 242 at an available memory location given by a pointer retrieved from the free pointer module. If the buffered PDU is a conventional PDU, i.e., a non-TG-PDU, the PDU type query (test 806) is answered in the negative and the enqueue controller 320 repeats the steps of receiving (step 802) and enqueuing (step 804) for the next PDU.

If the buffered PDU is a TG-PDU, the PDU type query (test 806) is answered in the affirmative and the enqueue controller 320 proceeds to construct a linked list associated with the particular priority queue 502. In the process of building the linked list, the enqueue controller 320 associates (step 808) the TG-PDU with the preceding entry in the linked list. In particular, the LL pointer of the previous entry is assigned the buffer memory address to which the current TG-PDU is enqueued (step 804), thereby making the previous node in the linked list point to the current node. Unless the PDU is the final TG-PDU of the linked list, the enqueue controller 320 proceeds to receive (step 802) and enqueue (step 802) the next PDU. If the PDU enqueued (step 804) is the final TG-PDU of the linked list, the last TG-PDU determination step (test 810) is answered in the affirmative and the enqueue controller 320 associates (step 812) the TG-PDU with the first node in the linked list by setting the LL pointer for the last TG-PDU equal to the buffer memory address of the first PDU in the linked list.

If the priority queue is a conventional priority queue, the process of receiving and enqueuing PDUs is repeated indefinitely provided the PDUs are dequeued at a rate sufficient rate. In the case of a TG priority queue, however, the construction of the linked list is terminated upon receipt of all the TG-PDUs from the traffic generator 150 for the particular TG priority queue, which is then followed by the repeated transmission of the test packets to the EUT 101.

Figure 9:
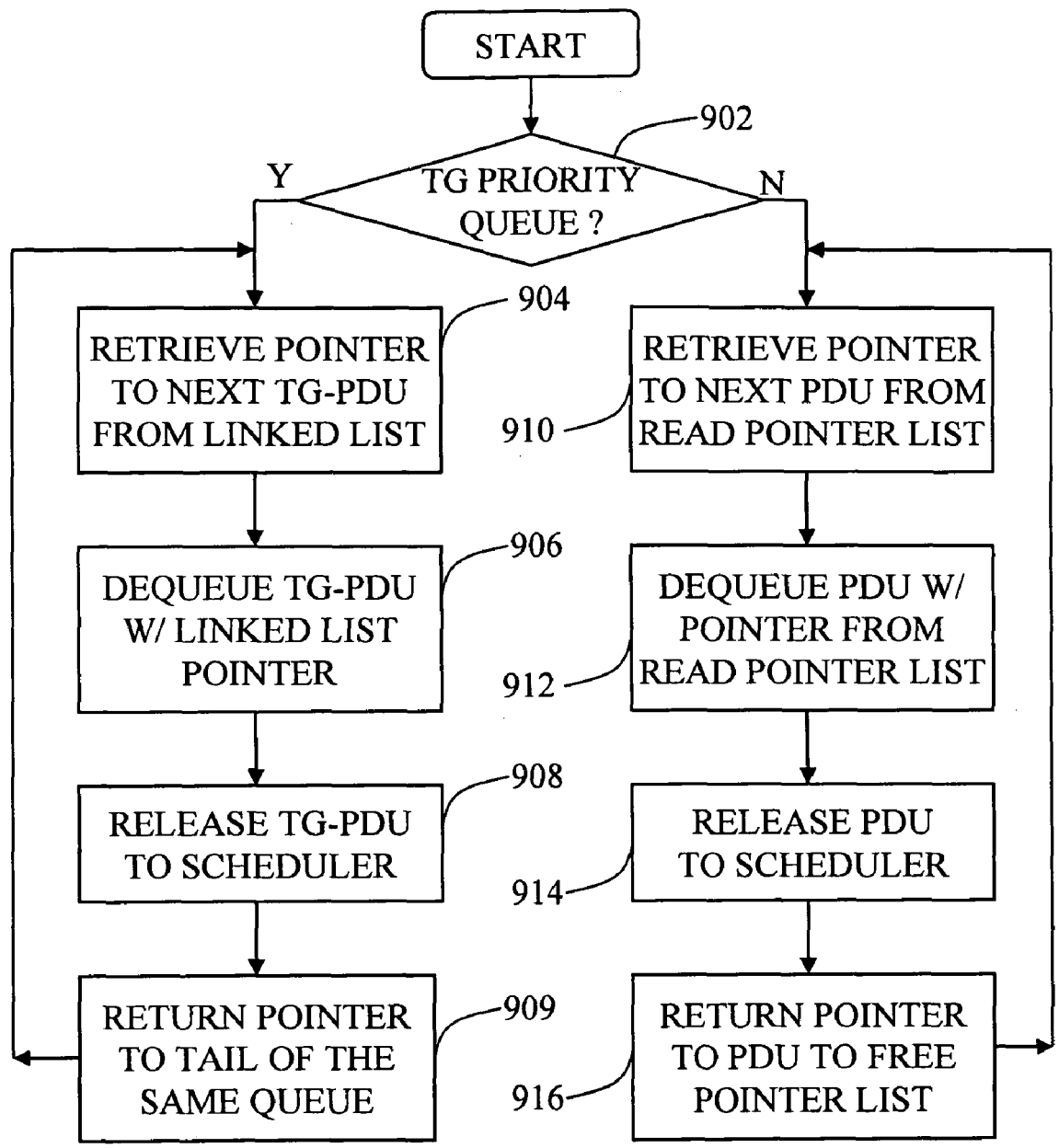
FIG. 9 is a flowchart of the method by which a dequeue controller releases test packets for a given priority queue of the buffer, according to the second embodiment of the present invention.

Illustrated in FIG. 9 is the method by which the dequeue controller releases test packets for a given priority queue of the buffer. If the given priority queue 502 is a TG priority queue, the priority queue type query (test 902) is answered in the affirmative and the dequeue controller 322 proceeds to release the TG-PDU from the buffer 242. In the steady state, the controller 322 retrieves (step 904) an LL pointer associated with the preceding dequeued TG-PDU that is used to dequeue (step 906) the current TG-PDU from the buffer 242. In the process of releasing (step 908) the TG-PDU to the scheduler 244, the dequeue controller 322 advances by retrieving the next LL pointer (step 904) to the next TG-PDU. The LL pointer of the released TG-PDU is effectively returned to the tail of the same queue from which it was selected. Because the last entry in the linked list includes a pointer to the TG-PDU at the head of the linked list, the TG-PDUs are repeatedly retrieved from the linked list in a continuous loop and the test data streamed to the EUT 101 for as long as the TG priority queue is enabled.

If the given priority queue is a conventional priority queue, the queue priority queue type query (test 902) is answered in the negative and the dequeue controller 322 proceeds to release the PDU from the buffer 242. The controller 322 retrieves (step 910) the pointer to the next PDU by consulting a read pointer list or simply incrementing the previous pointer, for example. The PDU at the buffer memory address indicated by the read pointer is then dequeued (step 912) and released (step 914) to the scheduler 244. In contrast to a TG priority queue, the pointer associated with the released PDU is returned (step 916) to the free pointer list 512 of the enqueue controller 320 so that a new PDU may be written to the associated memory cell.

While the method of dequeuing a TG priority queue described above employs a predetermined linked list in the form of an infinite loop in which the last LL pointer is directed to the first element of the linked list, the enqueue controller in some embodiments includes a first in first out (FIFO) memory in which the TG-PDUs and LL pointer are buffered. With the exception of the last element of the buffer, each element includes an LL pointer that points to the subsequent TG-PDU. The LL pointer at the tail, however, is temporarily undefined and does not point to the head of the TG priority queue. As the first TG-PDU at the head of the queue is dequeued, the dequeue controller concurrently re-equeues the first TG-PDU at the tail of the TG priority queue. In the process, the original head TG-PDU, now the new tail of the FIFO, is linked to the preceding element, namely the original tail of the FIFO. The dequeue controller repeats the steps of dequeueing TG-PDUs, re-enqueueing them at the tail of the FIFO, and linking the re-enqueued TG-PDU to the preceding LL pointer. In this manner, the TGM-enabled switch or switching module is adapted to repeatedly dequeue the entire TG priority queue and behave like and infinite loop. As an artisan of ordinary skill will appreciate, the FIFO memory may be converted from a TG priority queue to a conventional priority queue, and vice versa, at any time by changing the source of the PDUs from the dequeued PDUs to egress PDUs.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A data communications switching device for performing traffic generation in a data communications network comprising equipment under test (EUT), the switching device comprising:
    at least one port configured to receive a first plurality of protocol data units (PDUs);
    a routing engine configured to execute forwarding operations on the first plurality of PDUs;
    a traffic generator configured to produce a second plurality of PDUs; and a plurality of priority queues; wherein the switching device is configured to:
        enqueue the first plurality of PDUs and second plurality of PDUs in the plurality of priority queues, selectively associate the second plurality of PDUs using at least one linked list;
        repeatedly dequeue the second plurality of PDUs from the plurality of priority queues using the at least one linked list, wherein the switching device further includes a scheduler configured to dequeue the first plurality of PDUs and second plurality of PDUs dequeued from the plurality of priority queues, wherein the scheduler dequeues the first plurality of PDUs and second plurality of PDUs using a bandwidth allocation scheme selected from the group consisting of: strict priority, round robin, and weighted fair queuing, wherein the rate at which the second plurality of PDUs are transmitted from data communications switching device is programmable, and disassociating the first plurality of PDUs from the first set of pointers; and
    a traffic monitor configured to receive the second plurality of PDUs from EUT and compile traffic generation statistics that are usable by the switching device if the switching device evaluates the forwarding operability of the EUT.

2. The data communications switching device of claim 1, wherein the first plurality of PDUs are associated with a first set of pointers to the plurality of priority queues, and the second plurality of PDUs are associated with a second set of pointers to the plurality of priority queues.

3. The data communications switching device of claim 2, wherein the at least one linked list comprises the second set of pointers.

4. The data communications switching device of claim 2, wherein the switching device is configured to: dequeue the first plurality of PDUs from the plurality of priority queues; and disassociate the first plurality of PDUs from the first set of pointers.

5. The data communications switching device of claim 2, wherein the switching device further includes a scheduler for transmitting PDUs from the plurality of priority queues.

6. The data communications switching device of claim 2, wherein the switching device is further configured to dequeue the first plurality of PDUs from the plurality of priority queues.

7. A method of performing traffic generation in a data communications switching device within a network comprising equipment under test (EUT), the switching device comprising:
    receiving a first plurality of protocol data units (PDUs) addressed to one or more destination nodes reachable through the switching device;
    preparing the first plurality of PDUs for forwarding to one or more destination nodes;
    generating at a traffic generator a second plurality of test PDUs;

enqueuing the first plurality of PDUs and second plurality of test PDUs in a plurality of priority queues;

associating the second plurality of test PDUs; and dequeuing the second plurality of test PDUs from the plurality of priority queues, wherein the second plurality of test PDUs are associated with at least one linked list, and the second plurality of test PDUs dequeued from the plurality of priority queues with the at least one linked list, wherein the first plurality of PDUs are associated with a first set of pointers to the plurality of priority queues, and the second plurality of test PDUs are associated with a second set of pointers to the plurality of priority queues, wherein the method further comprises the steps of: dequeuing the first plurality of PDUs from the plurality of priority queues; and disassociating the first plurality of PDUs from the first set of pointers and dequeuing the second plurality of test PDUs from the associated priority queues comprises the steps of: releasing one of the second plurality of test PDUs for transmission to the EUT; and retrieving a linked list pointer to a next test PDU to be released, wherein the linked list pointer selected from the second set of pointers using the linked list.

8. The data method of performing traffic generation of claim 7, wherein the second plurality of test PDUs are associated with at least one linked list, and the second plurality of test PDUs dequeued from the plurality of priority queues with the at least one linked list.

9. The data method of performing traffic generation of claim 8, wherein the first plurality of PDUs are associated with a first set of pointers to the plurality of priority queues, and the second plurality of test PDUs are associated with a second set of pointers to the plurality of priority queues.

10. A data communications switching device for performing traffic generation in a data communications network comprising equipment under test (EUT), the switching device comprising:

a first set of at least one priority queue;

a queue manager configured to:

enqueue a plurality of protocol data units (PDUs) in each of the at least one priority queue, dequeue the plurality of PDUs from each of the at least one priority queue, and re-enqueue the plurality of dequeued PDUs in the at least one priority queue, wherein the switching device further comprises a second set of at least one priority queue for buffering one or more egress PDUs, wherein the switching device is configured to concurrently dequeue egress PDUs from the second set of at least one priority queue and dequeue the plurality of PDUs from each of at least one priority queue of the first set, and wherein the first plurality of PDUs is disassociated from the first set of pointers; and a traffic monitor configured to receive the plurality of PDUs in each of the at least one priority queue from the EUT and compile traffic generation statistics that are usable by the switching device if the switching device evaluates the forwarding operability of the EUT.

11. The switching device of claim 10, wherein each of the at least one priority queue comprises a linked list, each linked list comprising a plurality of pointer, each pointer being associated with one of the plurality of enqueued PDUs.

12. The switching device of claim 10, wherein the at least one priority queue is a first in first out (FIFO) memory.

13. The switching device of claim 10, wherein the switching device is a multi-layer switch configured to perform switching and routing operations in accordance with Layer 1 and Layer 2 of the Open Systems Interconnect (OSI) reference model.

* * * * *